T. A. DORA.
SLED MOBILE.
APPLICATION FILED FEB. 11, 1913.
1,086,033.
Patented Feb. 3, 1914.
3 SHEETS—SHEET 2.
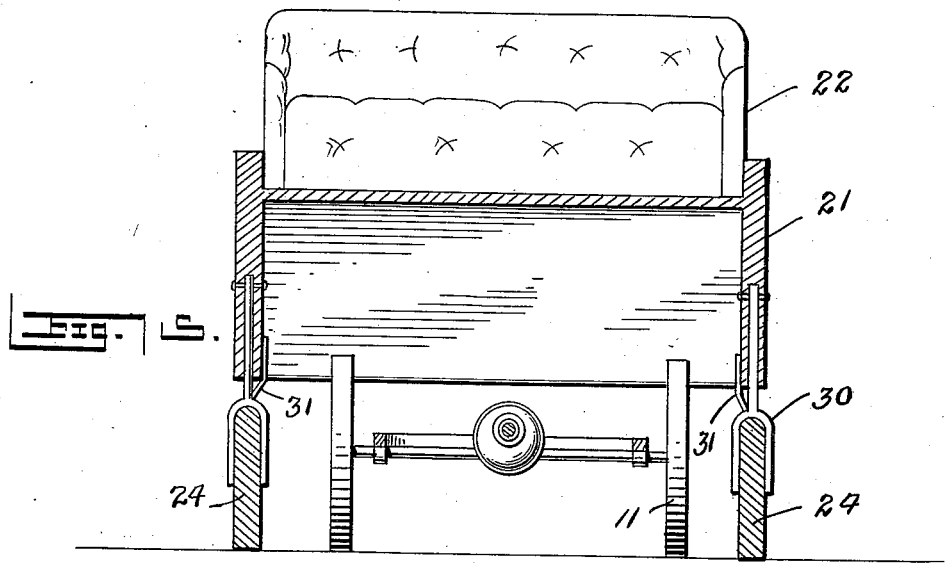
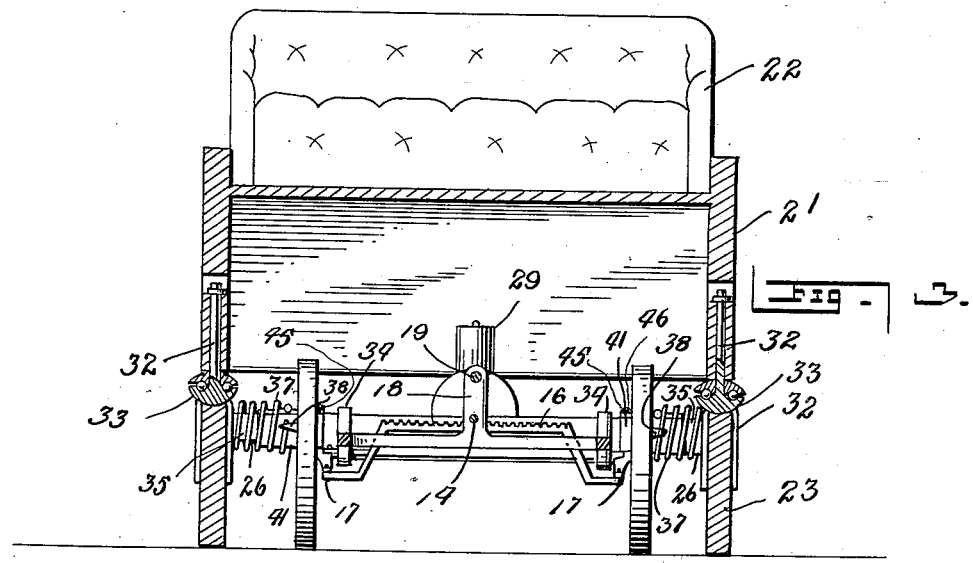
Witnesses
Inventor
T. A. Dora.
Attorney

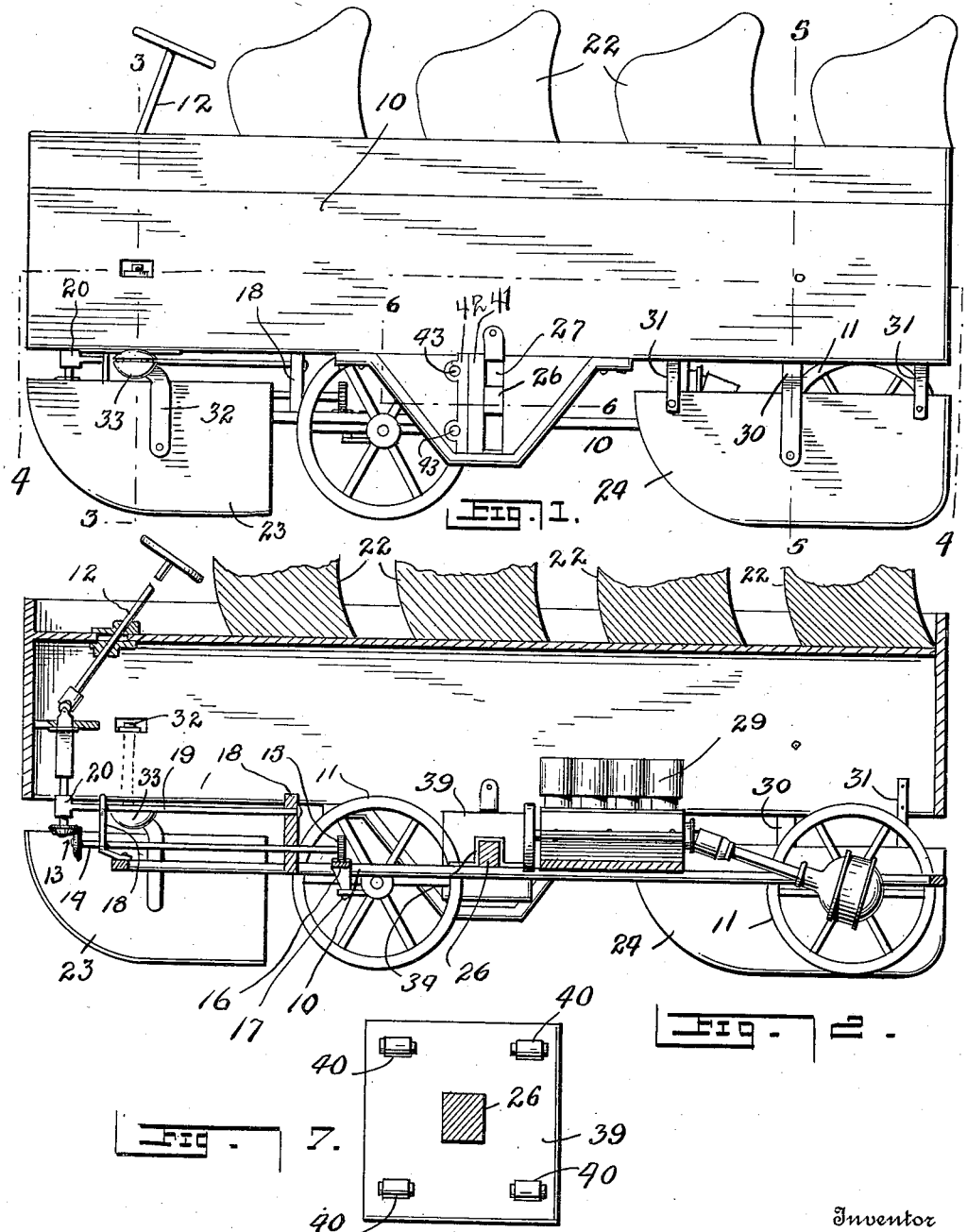

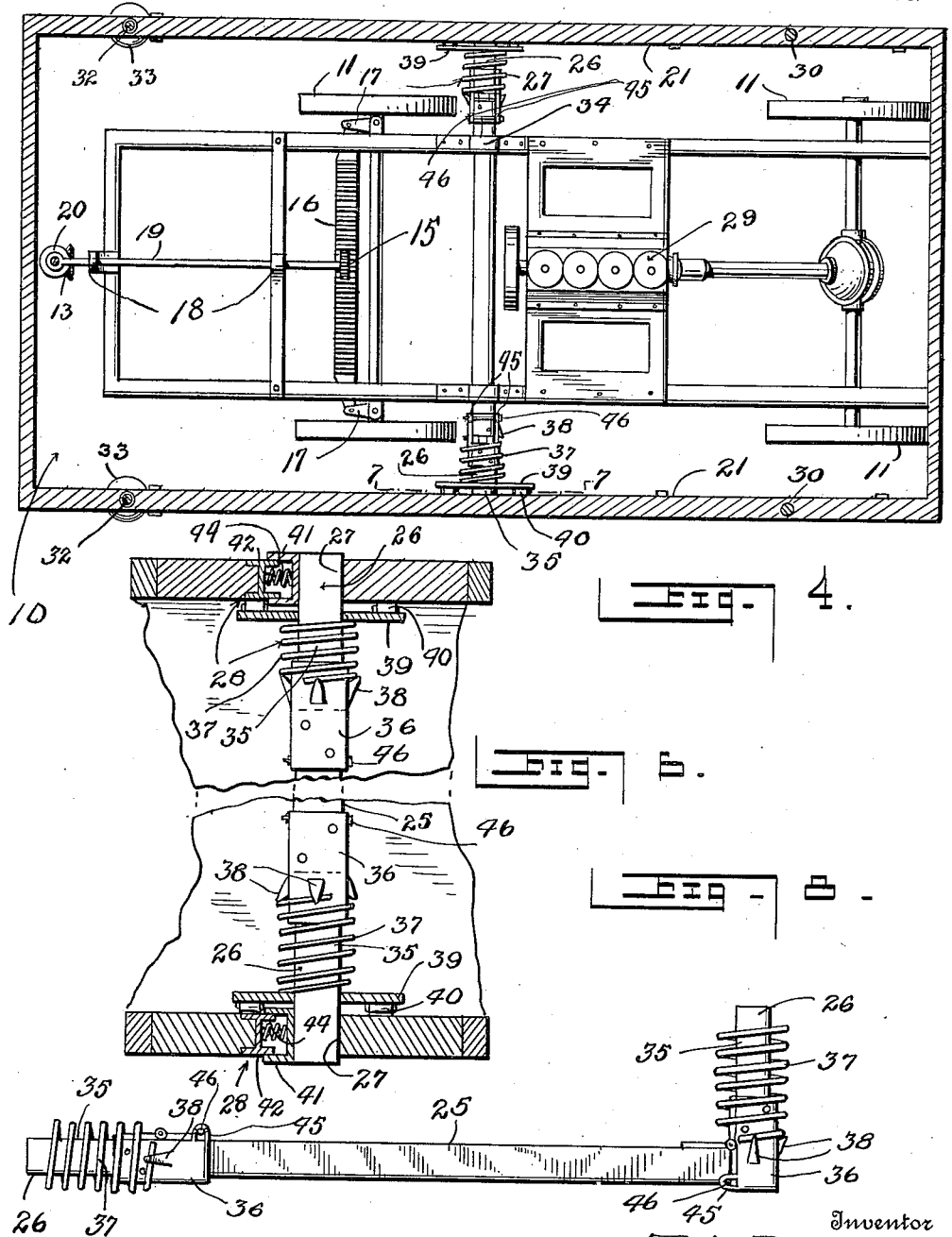

UNITED STATES PATENT OFFICE.

TOMY A. DORA, OF CALDERPARK, UTAH.

SLED-MOBILE.

1,086,033.  Specification of Letters Patent.  Patented Feb. 3, 1914.

Application filed February 11, 1913. Serial No. 747,821.

*To all whom it may concern:*

Be it known that I, TOMY A. DORA, a citizen of the United States, residing at Calderpark, in the county of Salt Lake, State of Utah, have invented certain new and useful Improvements in Sled-Mobiles; and I do hereby declare the following to be a full, clear, and exact description of the invention, such as will enable others skilled in the art to which it appertains to make and use the same.

This invention relates to sled mobiles and has for an object to provide a device of this character in which the frame of the running gear is separate from the body which carries the sleds, there being a yielding connection between the frame and the body to accommodate relative movement of these parts when the wheels, which are the driving apparatus, are higher or lower than the treads of the sleds.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification Figure 1 is a side elevation of the sled mobile. Fig. 2 is a longitudinal sectional view through the sled mobile. Fig. 3 is a vertical sectional view taken on the line 3—3 Fig. 1. Fig. 4 is a horizontal sectional view taken on the line 4—4 Fig. 1. Fig. 5 is a vertical sectional view taken on the line 5—5 Fig. 1. Fig. 6 is a vertical sectional view taken on the line 6—6 Fig. 1. Fig. 7 is a fragmentary cross sectional view taken on the line 7—7 Fig. 4. Fig. 8 is a fragmentary detail view showing an end portion of the body supporting bar with the terminal rocked up.

Referring now to the drawings in which like characters of reference designate similar parts, 10 designates in general the frame or chassis of an automobile which is equipped at the front and rear ends with ground wheels 11, the front wheels being dirigible and being steered by means of a steering column 12 which has a miter gear connection 13 with a horizontal shaft 14 that in turn has a gear connection 15 with a rack bar 16 that connects the steering heads 17 of the front wheels, the shaft 14 being supported by a plurality of bearings 18 which carry at their upper ends a rod 19 that is terminally equipped with a sleeve 20 which supports the lower end of the steering column in operative position.

The above described frame is separate from the body, and in the present embodiment the latter is shown to comprise a box 21 which is equipped with a plurality of passenger carrying seats 22 and is supported upon the ground by front runners 23 and rear runners 24 arranged outside of the ground wheels 11. The body is connected centrally to the frame by a transverse bar 25 the ends 26 of which are slidably fitted in vertical slots 27 formed in the sides of the box 21, the bar bearing at the ends against cushion elements designated in general by the numeral 28 in Fig. 6 and arranged in the upper ends of the slots. This construction provides a yielding connection between the frame and the body to accommodate relative movement of the parts when the wheels are higher or lower than the treads of the sleds.

The rear wheels of the sled mobile are the drive wheels and are rotated in the usual manner through the instrumentality of a motor shown conventionally at 29. The rear sleds 24 are fixed to the body through the instrumentality of forks 30 best shown in Fig. 5, there being a strap 31 fixed to the body and to the related sled in advance and in rear of each fork.

The front sleds 23 are free to follow the motion of the body as imparted by the dirigible front wheels, and for connecting these sleds to the body a pair of forks 32 best shown in Fig. 3 are secured to the body and to the related sleds, each fork being equipped with a ball bearing swivel joint 33 as shown in Fig. 1 to facilitate swinging movement of the sleds.

The bar 25 is fixed to the frame by means of strap brackets 34, and by now referring to Figs. 4, 6 and 8, it will be seen that the bar is equipped with hinged terminals 35 which may be swung upwardly upon the front end of the body being raised, to facilitate removal of the body from the frame. The hinged ends are held against downward swinging movement by means of a U-shaped socket 36 which is integral with each end of the bar and straddles the related swinging terminal. For holding the swinging terminals against accidental upward movement, each terminal is encircled by a helical spring 37 which bears against stop lugs 38 carried on the socket and against a slide plate 39 arranged on the terminal and equipped on the outer face with rollers 40 which bear upon the inner face of the adjacent side of the box 21. Upon manual movement outwardly of the spring off from the related socket, the related terminal is free to swing upwardly.

The particular cushion element designated by the numeral 28 is preferably formed from a channel iron 41 which is fixed to the upper end of the related slot 27 in the box side and mounted for telescoping movement in the channel iron is a block 42 which is preferably of I-beam construction and is fixed to the related terminal 35 of the bar by means of bolts 43, there being a serial of helical springs 44 carried by this block and entering the channel iron 42. This construction is best shown in Figs. 2 and 6.

It will thus be seen that a sled mobile is provided in which the body is separate from the frame carrying the running gear and is connected to the frame by means of a yielding connection which will permit relative movement of the parts when the sleds are lower or higher than the ground wheels. Furthermore it will be seen that the body may be easily and quickly removed from the frame by simply lifting the forward end of the body and rocking upwardly the pivoted ends of the bar 25.

As an additional means for positively preventing accidental swinging up of the terminals of the bar 25, each socket 36 is equipped on the top edges with integral eyes 45 through which a pin 46 is passed above the bar. This pin must first be removed to facilitate rocking up of the end of the bar.

What is claimed, is:—

In a sled mobile, a dirigible traction frame, a body carried by and separate from said frame, a bar fixed transversely across said frame, hinged ends on said bar projecting through vertical slots in the sides of said body, and means for holding said ends stationary in alinement with said bar, said bar forming a yielding connection between said body and said frame.

In testimony whereof, I affix my signature, in presence of two witnesses.

TOMY A. DORA.

Witnesses:
J. C. WILLIAMS,
W. E. WILLIAMS.

Copies of this patent may be obtained for five cents each, by addressing the "Commissioner of Patents, Washington, D. C."